United States Patent
Browne et al.

(10) Patent No.: US 12,537,566 B2
(45) Date of Patent: Jan. 27, 2026

(54) RADIO SYSTEM USING A PHASE-RECONFIGURABLE REFLECTARRAY FOR ADAPTIVE BEAMFORMING

(71) Applicant: Massachusetts Institute of Technology, Cambridge, MA (US)

(72) Inventors: David W. Browne, Glendale, CA (US); Swaroop Appadwedula, Belmont, MA (US); Christian D. Chapman, Cambridge, MA (US); Keith W. Forsythe, Lexington, MA (US); Gary F. Hatke, Westford, MA (US); Benjamin R. Guerriero, Waltham, MA (US); William F. Moulder, Billerica, MA (US); Navid Yazdani, Sudbury, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 135 days.

(21) Appl. No.: 18/517,727

(22) Filed: Nov. 22, 2023

(65) Prior Publication Data

US 2024/0178885 A1    May 30, 2024

Related U.S. Application Data

(60) Provisional application No. 63/385,427, filed on Nov. 30, 2022.

(51) Int. Cl.
*H04B 7/04* (2017.01)
*H04B 7/0408* (2017.01)
*H01Q 3/26* (2006.01)

(52) U.S. Cl.
CPC ....... *H04B 7/04013* (2023.05); *H04B 7/0408* (2013.01); *H01Q 3/2611* (2013.01)

(58) Field of Classification Search
CPC .. H04B 7/04013; H04B 7/0408; H04B 7/145; H01Q 3/2611; H01Q 15/147; H01Q 3/46; H01Q 15/148
See application file for complete search history.

(56) References Cited

U.S. PATENT DOCUMENTS 6,031,506 A      2/2000 Cooley et al.
9,219,508 B1 *  12/2015 Veysoglu ............... H04B 1/126
(Continued)

FOREIGN PATENT DOCUMENTS

WO   WO-2023058045 A1 *  4/2023   ......... H04B 7/04013

OTHER PUBLICATIONS

R. P. Jover et al., "5G NR Jamming, Spoofing, and Sniffing: Threat Assessment and Mitigation," 2018 IEEE International Conference on Communications Workshops (ICC Workshops). (Year: 2018).*

(Continued)

*Primary Examiner* — Sophia Vlahos
(74) *Attorney, Agent, or Firm* — Nields, Lemack & Frame, LLC

(57) ABSTRACT

The disclosed system uses a less complex system of a single radio receiver-frontend with a phase-reconfigurable reflectarray and an antenna to form beams in directions of the desired arriving signals while forming nulls in directions of the arriving radio interference signals. This is done by configuring each reflector with an appropriate phase-shift state so that the amplification of the desired radio signals and the nulling of the undesired radio signals happen at the point all reflected radio signals combine at the antenna (before the receiver frontend). In comparison, a conventional digital receive array achieves beams and nulls by taking the sampled radio signal streams at the outputs of the receiver frontends, multiplies each sample stream by a digital weight to shift the stream's phase and/or amplitude and then com- (Continued)

bines the sample streams into one sample stream in which desired radio signals are amplified and undesired radio signals are attenuated.

20 Claims, 11 Drawing Sheets

(56) References Cited

U.S. PATENT DOCUMENTS

| | | | | |
|---|---|---|---|---|
| 12,015,459 | B2* | 6/2024 | Wang | H04B 7/0617 |
| 2014/0018120 | A1* | 1/2014 | Anbe | H04W 72/20 |
| | | | | 455/509 |
| 2022/0077919 | A1* | 3/2022 | Li | H04B 7/04 |
| 2024/0048188 | A1* | 2/2024 | Elshafie | H04B 7/04026 |
| 2025/0317165 | A1* | 10/2025 | Huang | H04B 7/04013 |

OTHER PUBLICATIONS

T. Jiang and W. Yu, "Interference Nulling Using Reconfigurable Intelligent Surface," in IEEE Journal on Selected Areas in Communications, vol. 40, No. 5, pp. 1392-1406, May 2022. (Year: 2022).*

Artiga. Null-Steering Reflectarrays for 5G Backhaul Networks Limited by Interference. 2017 11th European Conference on Antennas and Propagation (EUCAP). 4 pages. Mar. 2017.

Moulder et al. Scanning Reflectarray with Embedded Structural Grid for Deployable Applications. 2021 IEEE International Symposium on Antennas and Propagation and USNC-URSI Radio Science Meeting (APS/URSI). 2 pages. Dec. 2021.

Zhou et al. Beam Nulling Designs of Reflectarray Antenna Using Alternating Projection Method. 2020 Cross Strait Radio Science & Wireless Technology Conference (CSRSWTC). 3 pages. Dec. 2020.

Carrasco et al. Reflectarray Element Based on Aperture-Coupled Patches With Slots and Lines of Variable Length. IEEE Transactions on Antennas and Propagation. vol. 55, Iss. 3, pp. 820-825, Mar. 2007.

Dahri et al. A Review of Wideband Reflectarray Antennas for 5G Communication Systems. IEEE Access. vol. 5, pp. 17803-17815, Aug. 2017.

Nayeri et al. Beam-Scanning Reflectarray Antennas. IEEE Antennas & Propagation Magazine. vol. 57, No. 4, pp. 32-47, Aug. 2015.

Pozar. Bandwidth of reflectarrays. Electronics Letters. vol. 39, No. 21, 3 pages, Oct. 2003.

* cited by examiner

RADIO SYSTEM USING A PHASE-RECONFIGURABLE REFLECTARRAY FOR ADAPTIVE BEAMFORMING

This application claims priority to U.S. Provisional Patent Application Ser. No. 63/385,427, filed Nov. 30, 2022, the disclosure of which is incorporated herein by reference in its entirety.

This invention was made with government support under FA8702-15-D-0001 awarded by the U.S. Air Force. The government has certain rights in the invention.

BACKGROUND

Conventional Anti-Jam (AJ) uplink receivers for satellite communications (satcom) are implemented on a satellite using antenna arrays, a plurality of digital receivers, and digital adaptive beamforming as illustrated in FIG. 1A. Adaptive beamforming is achieved by converting the incoming signals to the digital domain. These digital signals from each receiver are then weighted and combined to form the beams and nulls in the required directions. Each digital receiver in the array provides one spatial degree of freedom to null one source of radio interference. An array of N digital receivers can null only N-1 sources of radio interference while placing a beam on the source of a desired signal. Undesired radio signals are defined as those that interfere with the otherwise nominal operation of a Radio System. These signals may be within a Radio System's nominal operating frequency bands or in any frequency bands that a Radio System's receivers are sensitive to.

The cost to field a satellite with a conventional AJ uplink receiver is dominated by its digital receiver array. The driving cost factors for a digital receiver array are its launch size and weight and the hardware complexity of: the radio-frontend; the adaptive beamforming processing; the antenna array; and the power and cooling systems for the aforementioned components. Since the number of radio interference sources that can be nulled by a digital receiver array scales linearly as the number of receivers in the array, there is a high cost to fielding constellations of communications satellites that can operate robustly in the presence of large numbers of radio signal interference sources. The plot in FIG. 1A shows an interference scenario where a conventional digital receiver array has insufficient antennas to provide the degrees-of-freedom needed to null the multitude of radio interference sources.

Therefore, it would be beneficial if there was a radio system that was able to operate robustly in the presence of large numbers of radio signal interference sources, without the cost and complexity associated with conventional systems.

SUMMARY

The disclosed system addresses this cost-challenge by using a less complex system of a single radio receiver-frontend with a phase-reconfigurable reflectarray and an antenna to form beams in directions of the desired arriving signals while forming nulls in directions of the arriving radio interference signals. This is done by configuring each reflector with an appropriate phase-shift state and/or attenuation state so that the amplification (constructive combining) of the desired radio signals and the nulling (destructive combining) of the undesired radio signals happen at the point all reflected radio signals combine at the antenna (i.e., before the receiver frontend). In comparison, a conventional digital receive array achieves beams and nulls by taking the sampled radio signal streams at the outputs of the receiver frontends, multiplies each sample stream by a digital weight to shift the stream's phase and/or amplitude and then combines the sample streams into one stream in which the desired radio signals are amplified and undesired radio signals are attenuated.

According to one embodiment, a system is disclosed. The system comprises a phase-reconfigurable reflectarray comprising a plurality of phase-reconfigurable reflectarray elements to receive radio signals; an antenna to receive signals redirected by the phase-reconfigurable reflectarray; and a radio that function together to form spatial beams that amplify desired radio signals received from one or more arrival directions and adaptively form spatial nulls to suppress undesired radio signals arriving from one or more directions. In some embodiments, the phase-reconfigurable reflectarray, the antenna, and the radio function together to form spatial beams that amplify its transmission of one or more radio signals in one or more desirable directions and adaptively form spatial nulls to suppress the transmission of one or more radio signals in one or more undesirable directions. In some embodiments, the radio performs processing necessary to compute a phase-state configuration for the plurality of phase-reconfigurable reflectarray elements such that spatial beams and nulls are formed. In some embodiments, the system is utilized in an anti-jam communications satellite, an anti-jam terrestrial communications radio or an anti-jam airborne communications radio.

In some embodiments, the radio comprises a radio-frontend in communication with the antenna to generate baseband signals; an array estimation processor to estimate radio parameters based on the baseband signals and iteratively generate candidate reflectarray phase-states to optimize an objective function; and an array control processor to receive the candidate reflectarray phase-states from the array estimation processor and generate control signals to control the plurality of phase-reconfigurable reflectarray elements. In certain embodiments, the radio parameters comprise total received power, received signal power, received interference power, and/or receiver noise power. In certain embodiments, the system includes an auxiliary antenna and an auxiliary radio-frontend, wherein an output of the auxiliary radio-frontend is also provided to the array estimation processor to estimate the radio parameters. In certain embodiments, the array estimation processor is configured to perform an online incremental search, comprising: estimating the radio parameters for a first reflectarray phase-state; generating a set of candidate reflectarray phase-states based on the radio parameters; providing each candidate reflectarray phase-state to the array control processor; receiving a baseband signal from the radio-frontend for each of the candidate reflectarray phase-states; and selecting one of the candidate reflectarray phase-states as causing a most beneficial incremental improvement to the objective function. In certain embodiments, the online incremental search is repeated a plurality of times, wherein the candidate reflectarray phase-state that is selected is then used to generate a new set of candidate reflectarray phase-states.

In some embodiments, the radio comprises a radio-frontend in communication with the antenna to generate baseband signals; an array estimation processor to estimate radio parameters based on the baseband signals and to generate reflectarray phase-states; an array beamformer processor to create a beam having certain radio and an array control processor to receive the parameters; reflectarray phase-states from the array estimation processor and information from the array beamformer processor and to generate control signals to control the plurality of phase-reconfigurable reflectarray elements. In certain embodiments, the array estimation processor is configured to perform an online-offline estimation, comprising: providing a first set of reflectarray phase-states to the array control processor; estimating the radio parameters for each of the reflectarray phase-states in the first set of reflectarray phase-states; and iteratively computing additional radio parameters based on the radio parameters obtained from the first set of reflectarray phase-states until a completion criteria is reached. In certain embodiments, the additional radio parameters comprise spatial covariance matrix of a signal-plus-interference or spatial covariance matrix of an interference alone or a spatial response vector of the phase-reconfigurable reflectarray to desired signals. In certain embodiments, the additional radio parameters that are computed are provided to the array beamformer processor, and wherein array beamformer processor uses the additional radio parameters and a configuration of the phase-reconfigurable reflectarray to generate a desired reflectarray phase-state; and the array beamformer processor forwards the desired reflectarray phase-state to the array control processor.

According to another embodiment, a method of providing protection against strong interference by suppressing interference power before it reaches a receiver disposed in the radio is disclosed. The method comprises using any of the systems described above wherein the plurality of phase-reconfigurable reflectarray elements are configured to destructively combine the interference power.

According to another embodiment, a method to provide, transmit, and receive beamforming from the same aperture by the same beamforming weights is disclosed. The method comprises using any of the systems described above.

BRIEF DESCRIPTION OF THE DRAWINGS

For a better understanding of the present disclosure, reference is made to the accompanying drawings, in which like elements are referenced with like numerals, and in which.

DETAILED DESCRIPTION

As with adaptive beamforming using conventional digital receiver arrays, the disclosed system is able to form the appropriate beams and nulls (a) without a priori knowledge of the arrival angle of the desired and undesired signals and (b) without a priori knowledge of the array's response manifold that may be obtained during an array response calibration process. An array's response manifold is the set of phase and magnitude responses for hypothetical signal wavefronts incident on the array from each and every possible arrival direction.

A further distinction of the disclosed system from the conventional approach of using a digital receiver array is that the appropriate phase-shift for each array element (reflector) is computed using observations from the single receiver. This is a significant challenge to overcome because only the combined effect of all reflectors is observable through the single receiver. The disclosed system uses processing approaches that compute the appropriate phase-shift configuration by iterating between different phase-state configurations over time, observing the single receiver output's digital signal stream for each configuration, and finally computing a reflectarray phase-state configuration that results in the requisite beams and nulls. This is in contrast to a conventional digital receiver array where the incident signals on each array element are digitally sampled by a dedicated receiver so that a set of samples from all elements may be used together in a single step to compute beamforming weights that produce the requisite beams and nulls (e.g., using one-step matrix inversion algorithms like the well-known Maximum SINR, MMSE, or MVDR approaches).

Figure 1A:
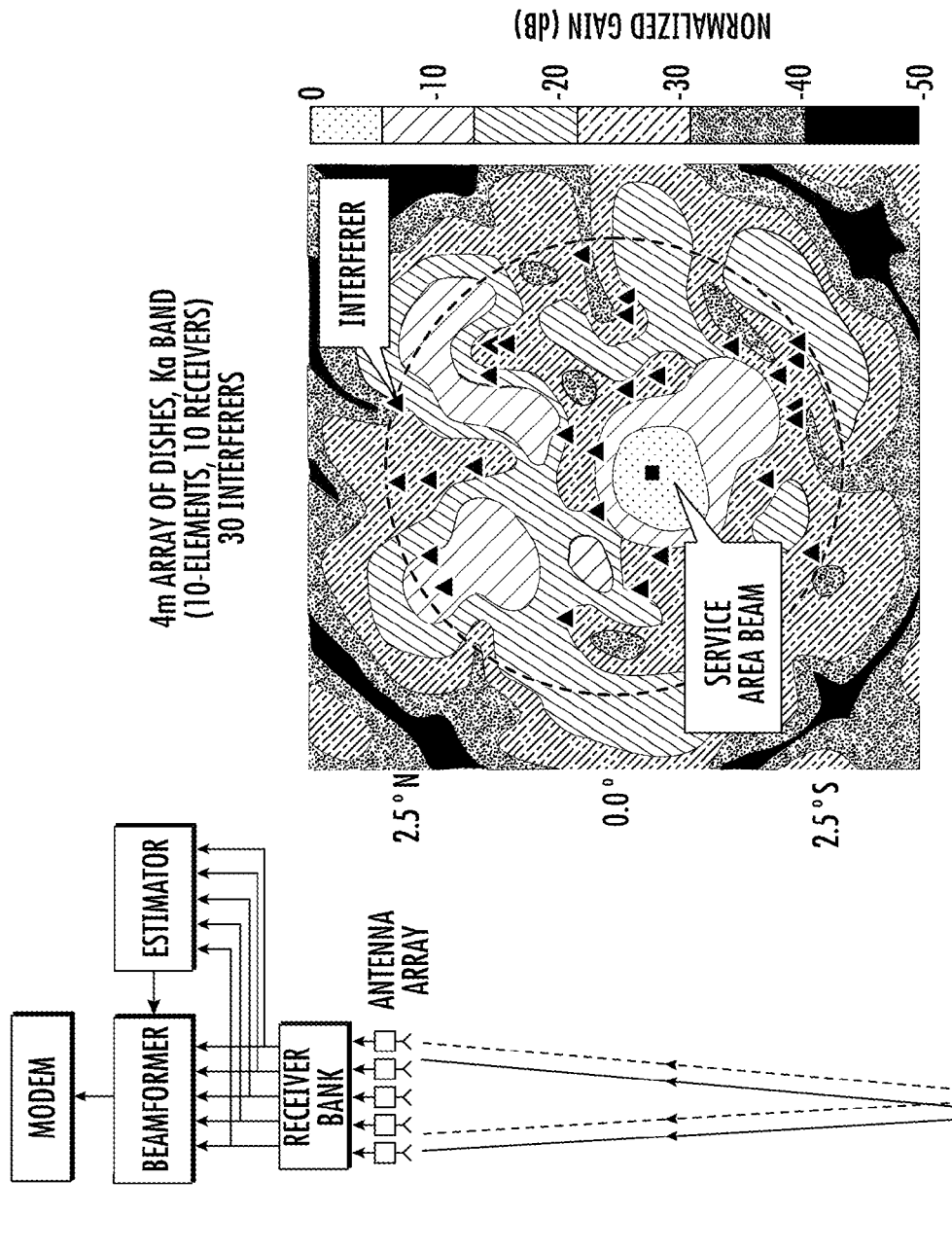
FIG. 1A shows a conventional anti-jam satcom uplink receiver system using an array of digital receivers and adaptive beamforming is unable to null more sources of radio interference than degrees of freedom in the array.
Figure 1B:
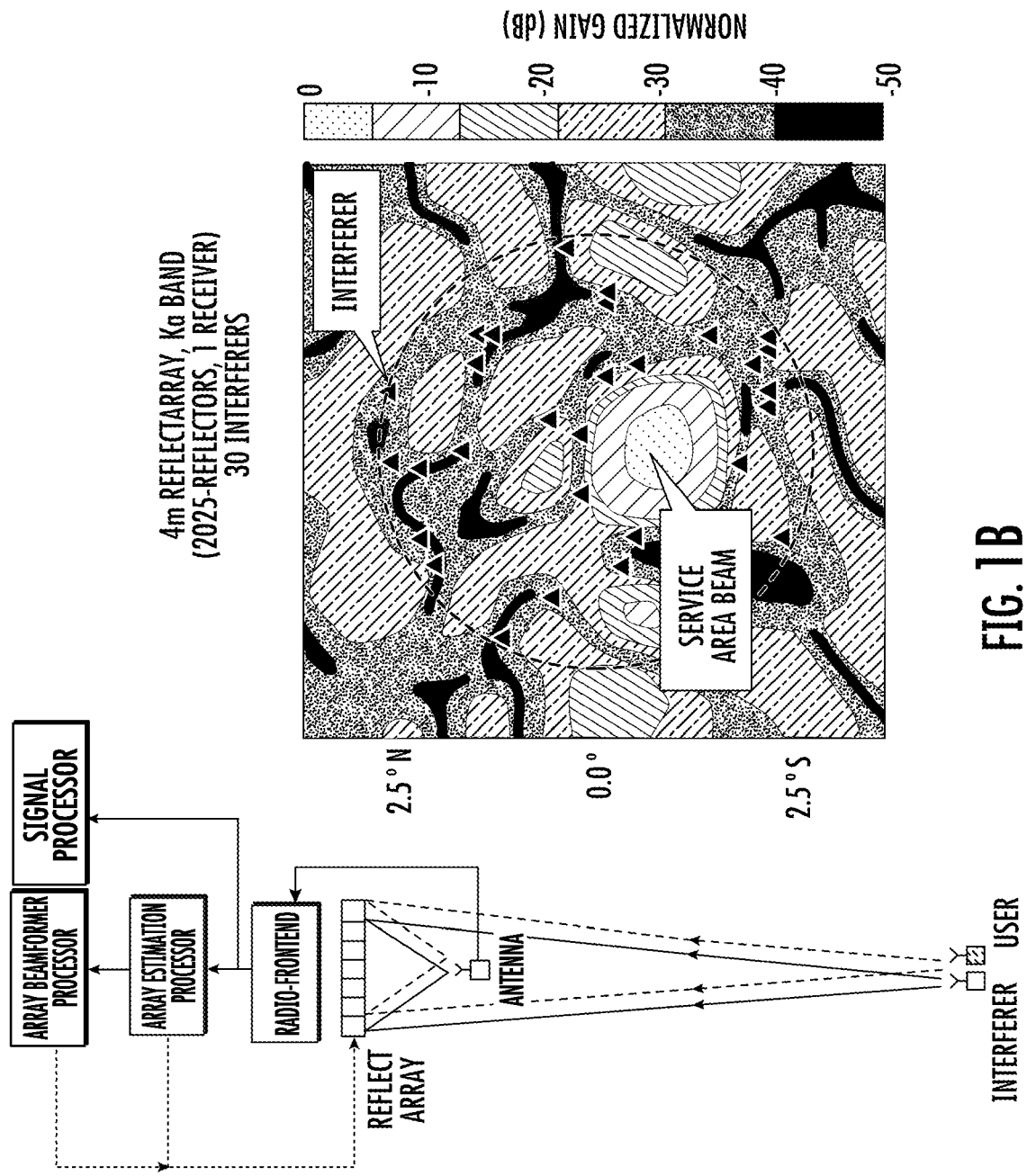
FIG. 1B shows an anti-jam beamforming system according to one embodiment that is able to use a single receiver to successfully null the same set of radio interference sources that the conventional system failed to null in FIG. 1A while still placing a beam on the desired service area.
Figure 1C:
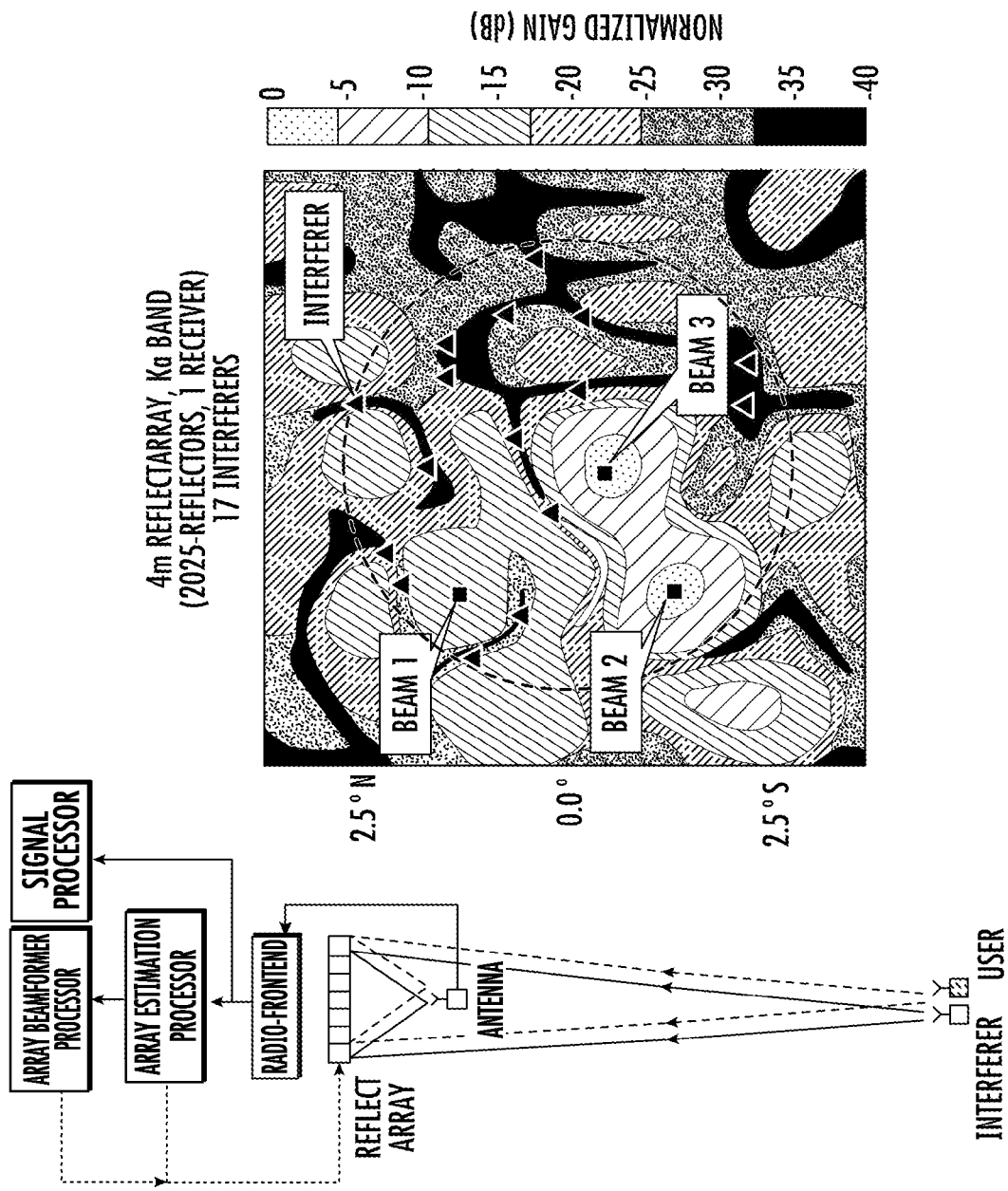
FIG. 1C shows the anti-jam beamforming system of FIG. 1B is able to use one receiver to place beams on multiple service areas while successfully nulling a multitude of radio interference sources.

An anti-jam uplink receiver model based on the proposed invention is illustrated in FIG. 1B. The modeled single-receiver system is simulated and shown in FIG. 1B to successfully null the same set of radio interference sources that the conventional system failed to null in FIG. 1A while still placing a beam on the desired service area. FIG. 1C shows the modeled single-receiver system forming multiple beams while successfully nulling a multiplicity of radio interference sources. Note that in these plots, the lighter shading indicates higher gain, while the darker shading indicates less gain. Thus, in FIG. 1C, the reflectarray is able to target three service areas while creating nulls around each of the interferers.

Figure 2B:
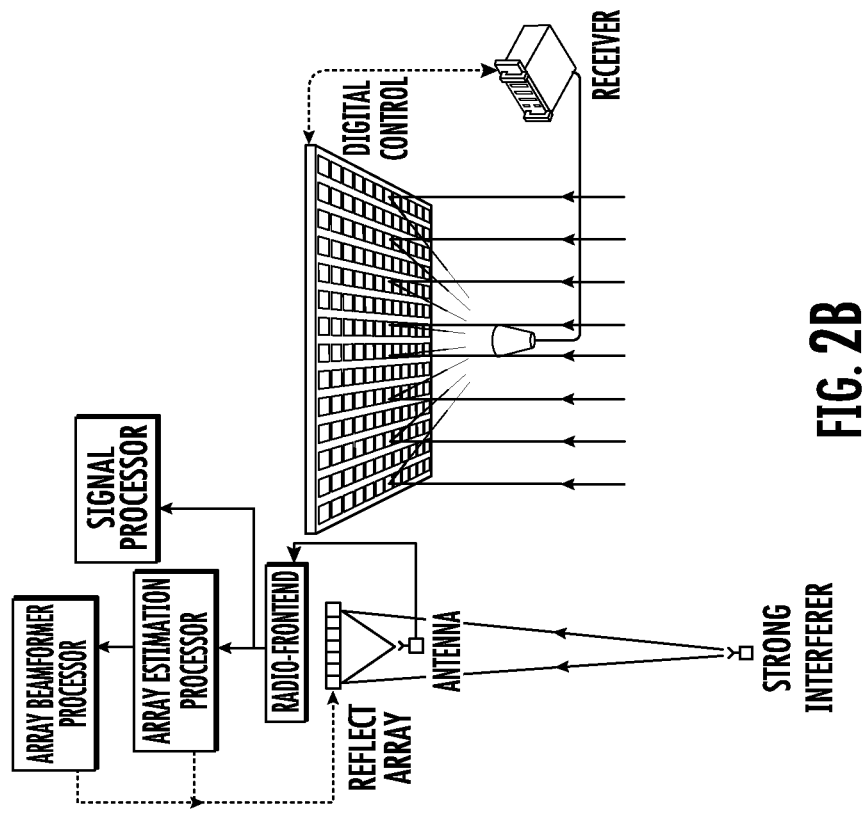
FIG. 2B is an illustration of how an anti-jam beamforming system based on the present disclosure protects the receiver-frontend from saturating.
Figure 2A:
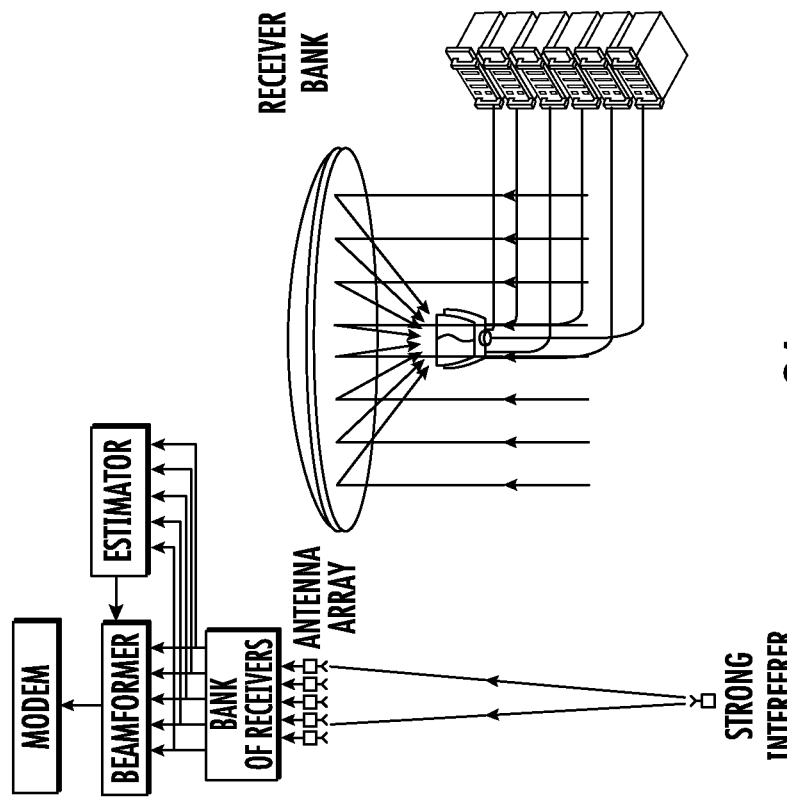
FIG. 2A is an illustration of how a conventional anti-jam satcom uplink receiver system using an array of digital receivers and adaptive beamforming can be driven into nonlinear operation by strong or near-in interference prior to digital beamforming.

The implementation of a conventional digital receiver array for anti-jam (AJ) applications is both a technical challenge and expensive because the receivers' frontends, which is the radio circuit that converts radio frequency signals to baseband digital samples, need high dynamic range to ingest and faithfully convert both the powerful radio interference signals and the weak desired signals to digital samples. If the interference is powerful enough, then the receiver-frontend can be driven into non-linear operation (e.g., frontend saturation or digital clipping) so that the adaptive beamforming digital processor cannot suppress the interference and the desired signal cannot be processed successfully. In conventional AJ systems, all signals are combined and routed to the digital receivers, which may result in saturation. This saturation condition is illustrated in FIG. 2A.

The disclosed system addresses the challenge of receiver dynamic range because, once the reflectarray's reflectors are each configured with the appropriate phase-shift state, the amplification of the desired radio signals and the nulling of the undesired radio signals happen at the point where all reflected radio signals reach the antenna. In this way, saturating levels of interference power do not reach the receiver. This nulling prior to the receiver is illustrated in FIG. 2B. Stated differently, the conventional system of FIG. 2A collects all incoming signals and then digitally processes the aggregate signal. In contrast, the present system manipulates the phase and/or amplitude of the reflectarray to filter unwanted signals prior to reaching the receiver. In this way, the reflectarray is configured such that destructive interference occurs for the unwanted signals, while constructive interference occurs for the desired signals.

It is sometimes desirable for a communication satellite wishing to operate both covertly and in the presence of interference to use the same antenna array for beamformed transmission as is used for beamformed reception of radio signals and for both transmission and reception (transception) to have gain patterns with the same beams and nulls. It is a challenge for a conventional digital radio transceiver array to achieve the same gain patterns for transmit and receive because the relative phase response between each of the transmit-frontend circuits and relative phase response between each of the receive-frontend circuits are not equivalent for transmit and receive. This non-equivalence between transmit and receive responses necessitates that, to achieve the same beam and null directions for both transmit and receive, the relative difference between the transmitter's and receiver's responses have to first be measured (calibrated) and then compensated during operation. This compensation is usually in the transmit processing side. The calibration and compensation processing add complexity to the system and calibration error results in reduced transmit beamforming and nulling performance.

The disclosed system addresses this transmit-receive response non-equivalence because it uses one antenna and reflectarray to form the same set of beams and nulls for both transmission and reception using a single phase-state configuration of the reflectarray. This is possible because (a) the phase-reconfigurable reflectarray, antenna and single transceiver frontend together have equivalent spatial responses for transmission and reception and (b) the phase-reconfigurable reflectarray and antenna together implement the signal phase-shifting and signal splitting/combining operations needed for transmit/receive beamforming respectively.

Having described the fundamental differences between the presently disclosed system and the prior art, a detailed description follows.

Figure 3:
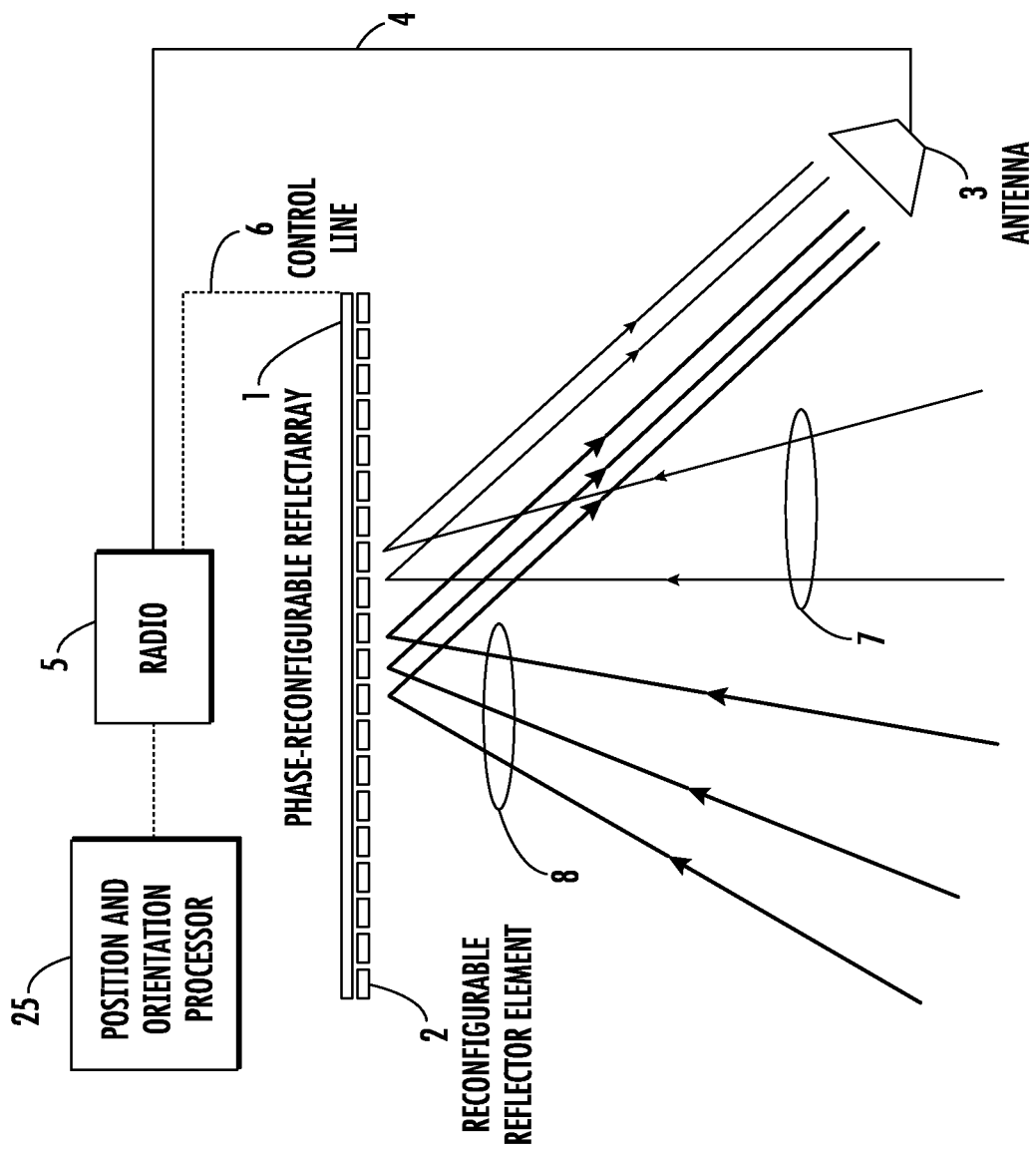
FIG. 3 illustrates a first embodiment of a radio system that includes a phase-reconfigurable reflectarray, an antenna, and a radio that function together to adaptively beamform in ways that amplify radio signals in one or more directions and suppress (null) undesired radio signals in one or more directions.

FIG. 3 shows the system according to one embodiment. In this embodiment, the system includes a phase-reconfigurable reflectarray 1 having a plurality of reconfigurable reflector elements, or reflectors 2. Signals are reflected toward an antenna 3. The aggregated analog signal travels from the antenna 3 to the radio 5 via a radio signal transmission line 4. The radio 5 then controls the phase-reconfigurable reflectarray 1 using control line 6. Also included in this figure are the arrival vectors 7 for a multiplicity of desired radio signals' wavefronts and the arrival vectors 8 for a multiplicity of undesired radio signals' wavefronts.

Figure 4:
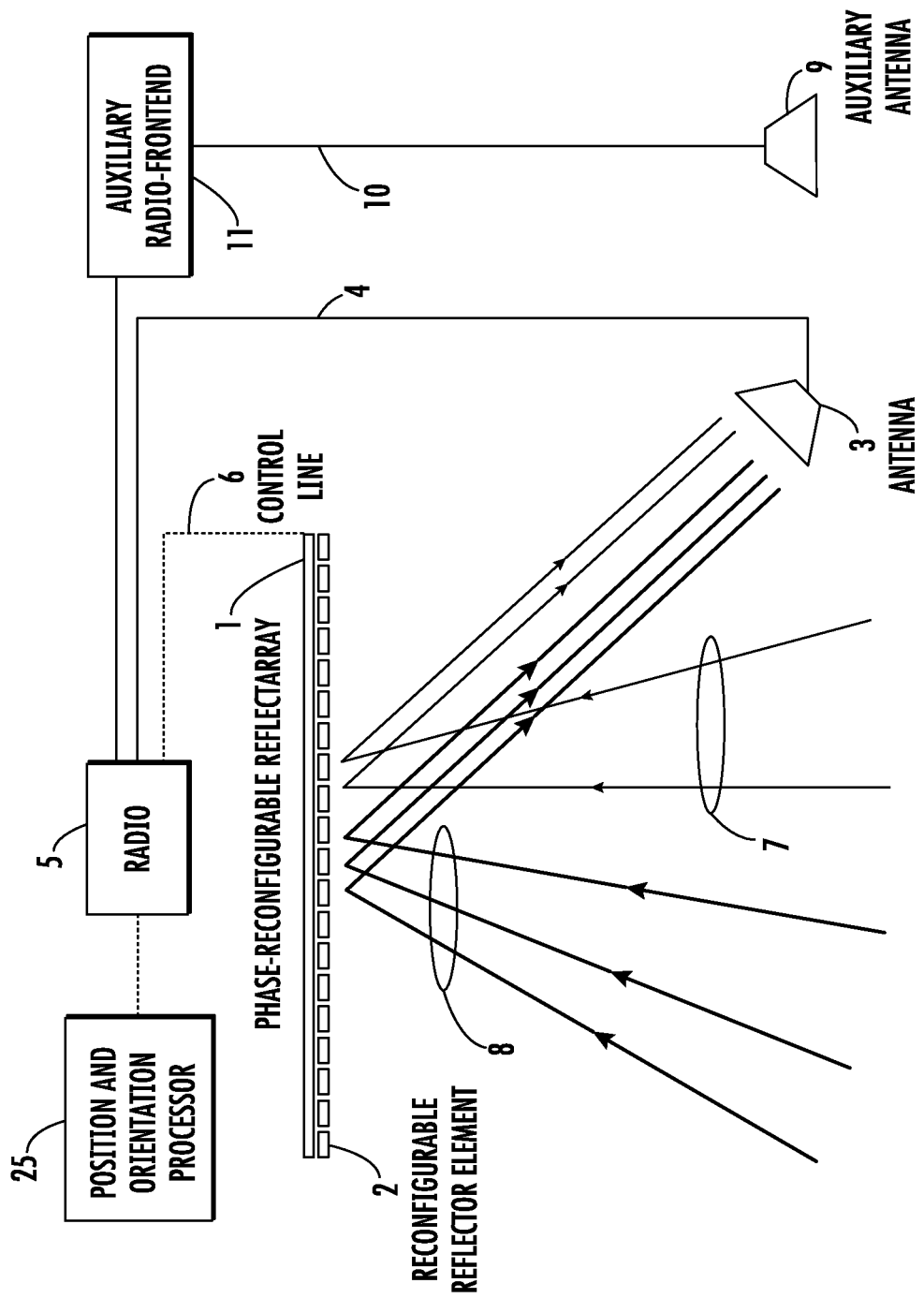
FIG. 4 illustrates a second embodiment of a radio system that includes a phase-reconfigurable reflectarray, an antenna, and a radio that includes an auxiliary antenna and function together to adaptively beamform in ways that amplify radio signals in one or more directions and suppress (null) undesired radio signals in one or more directions.

FIG. 4 shows a second embodiment wherein an auxiliary antenna 9 is included in the system. The auxiliary antenna 9 uses an auxiliary radio signal transmission line 10 to communicate with the auxiliary radio-frontend 11.

Each component is now described in more detail. In this disclosure, the term "phase-shift state" is used to describe the state of an individual reflector 2, while the term "phase-state configuration" is used to described the state of the entire reflectarray. Note that while these terms use the term phase, it is understood that these states may also include magnitude shifts as well. The transition of a reflector from one phase-shift state to another may be referred to as a "phase-state change".

As best seen in FIG. 3, the phase-reconfigurable reflectarray 1 comprises a plurality of phase-reconfigurable reflector elements (also referred to as reflectors 2) arranged on a two-dimensional surface, such as a rectangular plane or a three-dimensional surface, such as a paraboloid). The number of reflectors 2 in the array is not limited and may be over one thousand. For example, in FIG. 1B, the reflectarray is configured as an array having 45 rows and 45 columns. Each reflector 2 may assume one of a plurality of phase-shift states. In some embodiments, there may be 4 discrete phase-shift states. In other embodiments, there may be more than 4 discrete phase-shift states. In some embodiments, each reflector 2 may employ an electronic switching technology, such as Field Effect Transistor (FET) switches, varactor diodes, MEMS switches, or other suitable devices, to achieve different phase-shift states. In other embodiments, each reflector may employ a mechanic actuator to rotate or translate the reflector 2 to achieve different phase-shift states. In still other embodiments, each reflector 2 may employ a functional material, such as liquid crystal or graphene to achieve different phase-shift states. In yet other embodiments, the reflectors 2 may utilize a continuous set of phase-shift states. As noted above, the phase-shift state of the reflectors 2 may be configured at any time by the radio 5 using the control line 6. In some embodiments, each reflector 2 may be individually selected, while in other embodiments, a row or column of reflectors 2 is addressed at one time. Note that the control line 6 may be either a cable or a wireless connection. Further, in certain embodiments, the amplitude of each reflector 2 may also be configurable. In one embodiment, a switched set of impedance-matched loads (lossy elements) of different values (loss) may be inserted to achieve one of a given set of discrete losses and thereby achieve one of a given set of amplitude reductions on the reflected waves. Thus, in some embodiments, the reflectors 2 implement a discrete set of magnitude-changes and phase-shift states on the reflected signals. In other embodiments, the reflectors 2 implement a continuous set of magnitude-changes and phase-shifts on the reflected signals.

Thus, radio signals received from the environment around the system that are incident on a reflector 2 are reflected towards the antenna 3. Radio signals transmitted from the antenna 3 that are incident on a reflector 2 are reflected into the environment around the system.

A reflector's reflected radio signal is phase-shifted with respect to the phase of the incident radio signal on that reflector 2. Consequently, a reflected radio signal's phase-shift is dependent on the phase-shift state of the reflector 2.

Also note that the reflectors 2 are resonant at the same radio frequency bands and polarizations as the antenna 3.

The antenna 3 is mechanically positioned so that some set of the main or primary lobes from its gain pattern (the angular region of greatest sensitivity) cover some or all of the phase-reconfigurable reflectarray's reflectors 2. Radio signals from the phase-reconfigurable reflectarray 1 that are incident on the antenna 3 are conveyed to the radio 5 via a radio signal transmission line 4, which may be a cable or waveguide. Radio signals transmitted from the radio 5 to the antenna 3 via the radio signal transmission line 4 are radiated toward the phase-reconfigurable reflectarray 1. In some embodiments, the antenna 3 is implemented to have a non-steerable directional pattern. In other embodiments, the antenna 3 is implemented to have a steerable directional gain pattern where the steering is realized either by electronic or mechanical means. An example of electronic means may be to use a phased array as the antenna 3. Steering of the gain pattern of the antenna 3 changes the energy contribution across reflectors in the reflectarray which in turn changes the directionality and sidelobe levels of the reflectarray's gain pattern.

In some embodiments, the radio system is configured such that the antenna 3 and radio 5 are co-located on the same vehicle, platform, or structure as the phase-reconfigurable reflectarray 1. In other embodiments, the antenna 3 and radio 5 are located on different vehicles, platforms, or structures from the phase-reconfigurable reflectarray 1.

In certain embodiments, the system may also include a Position and Orientation Processor 25. The Position and Orientation Processor 25 may use established techniques to determine the position and orientation of the phase-reconfigurable reflectarray 1. Examples of the processing in the Position and Orientation Processor 25 include well established methods for estimating the spatial position of a body in space and the orientation of a body in space using combinations of accelerometers, magnetometers, gyroscopes, and global-positioning systems such as GPS. The Position and Orientation Processor 25 provides estimates of the system's position and orientation in space to the array estimation processor 13. In certain embodiments, the array estimation processor 13 may then use these estimates to determine the absolute directionality of the reflectarray's beams in space.

Figure 6:
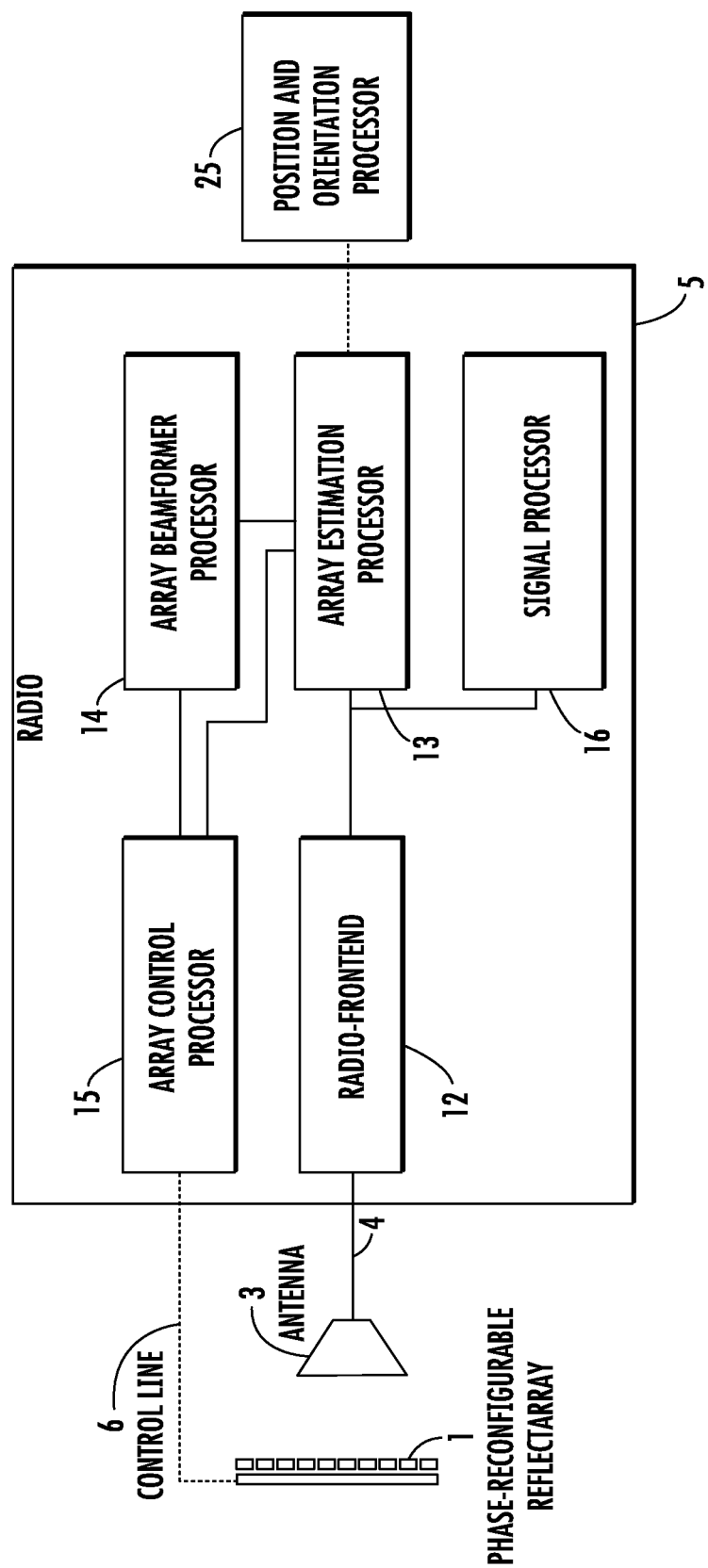
FIG. 6 shows a detailed block diagram of the radio used in the embodiment of FIG. 3.
Figure 7:
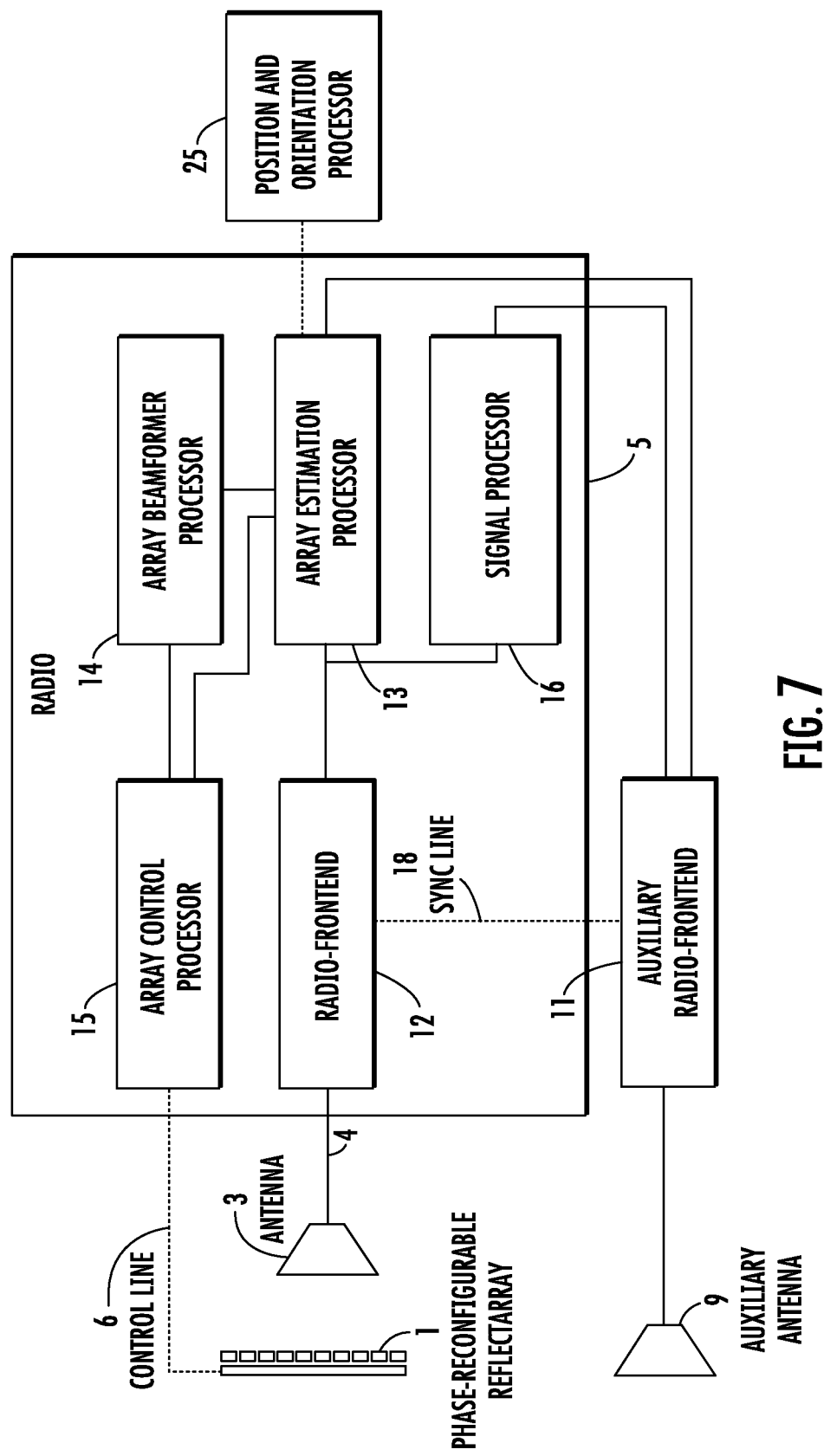
FIG. 7 shows a detailed block diagram of the radio used in the embodiment of FIG. 4.

The components of the radio 5 used in FIG. 3 are best seen in FIG. 6. The components of the radio 5 used in FIG. 4 are best seen in FIG. 7. The radio 5 includes a radio-frontend 12, an array estimation processor 13, an array beamformer processor 14, a array control processor 15 and a signal processor 16. In some embodiments, the signal processor 16 may include the modem processing shown in FIG. 1A. When operating as a receiver, this modem processing is responsible for performing the processing that recovers information bits from the received signal. When operating as a transmitter, the modem processing is responsible for embedding information bits in the transmitted signal in a way that the receiver can recover those bits. The processing is specific to the application and methods for doing the processing are widely known and used.

The radio-frontend 12 is used to convert analog signals at radio frequencies to equivalent digital signals at baseband. For radio signal reception, the radio-frontend 12 converts radio frequency signals arriving from the antenna 3 to baseband signals for input to the array estimation processor 13 and the signal processor 16. The components used to convert a radio frequency signal to baseband signals are well known and are implementation specific. For radio signal transmission, the radio-frontend 12 converts baseband signals from the signal processor 16 to radio frequency signals for input to the antenna 3.

The array estimation processor 13 takes baseband signals from the radio-frontend 12 and estimates response parameters of the phase-reconfigurable reflectarray 1 to radio signals incident on its reflectors 2. These parameters may include spatial covariance and/or parameters of the received signal, such as total signal power, desired signal power, noise power, interference power and others. The array estimation processor 13 may command the array control processor 15 to configure the phase-shift state of some or all of the reflectors 2 in the phase-reconfigurable reflectarray at certain times during the parameter estimation. Once complete, the estimated parameters may be provided as input to the array beamformer processor 14. The array estimation processor 13 may be implemented using analog and/or digital circuits to achieve its functions.

In the embodiment shown in FIG. 4, for radio signal reception, the array estimation processor 13 may take baseband signals from the auxiliary radio-frontend 11 in order to estimate additional parameters that aid in the estimation of parameters of the radio signals that are incident on the phase-reconfigurable reflectarray 1. These additional parameter estimates may improve processing outcomes under certain dynamic conditions of the undesired radio signals.

The array control processor 15 receives phase-state configurations from the array estimation processor 13 or array beamformer processor 14 and converts those configurations to the appropriate control signals that command the reflectors 2 of the phase-reconfigurable reflectarray 1 to implement the specified phase-shift states at the specified time. The control signals are sent by the array control processor 15 to the phase-reconfigurable reflectarray 1 via the control line 6. The array control processor 15 may be implemented using analog and/or digital circuits to achieve its functions. As explained in more detail below, in some embodiments, the input to the array control processor 15 may be the phase-shift configuration (also referred as the reflectarray state), which may be digital values corresponding to the discrete phase-shift states of each reflector or analog reflector states. The array control processor 15 then produces the driving signals, which may be clocked voltage logic levels or wireless control signals, needed by the phase-reconfigurable reflectarray 1 to implement those phase-shift states in the reflectors 2. The exact inputs and outputs will depend on the interface technology and interface definition implemented in hardware.

The array beamformer processor 14 uses coarse (uncalibrated) models of: the reflectors' possible set of phase-shift states; the antenna's gain pattern; and the position of the reflectors 2 with respect to the antenna 3. This model is used to compute a sequence of phase-state configurations for the phase-reconfigurable reflectarray 1 that allow the system to sequentially scan beams in azimuth and elevation to find the initial steered beams in the directions of the desired signals.

The array beamformer processor 14 takes the estimated parameters from the array estimation processor 13 and computes a phase-state change from the initial steered-beams phase-state of the phase-reconfigurable reflectarray 1 in order to achieve an adapted set of beams and nulls on the respective desired and undesired radio signals.

A subset of reflectors 2 may be chosen to undergo the phase-state change. This use of a subset limits the possible space of phase-state changes to allow one to be computed in a practical amount of time using a practical number of parameter estimates from the array estimation processor 13. An example of an efficient subset of reflectors 2 to select for a phase-state change are those that are illuminated by most of the gain of the antenna's gain pattern.

The computation for the phase-state change may use an objective function that seeks to maximize or minimize a certain parameter. For example, the objective function may seek to maximize the estimated signal-to-interference-plus-noise ratio (SINR). Alternatively, the objective function may seek to maximize the desired signal's power. In another embodiment, the objective function may seek to minimize the total received power under an assumption that the interference signals are the dominant source of power.

The computation for the phase-state changes may use a method by which an estimated spatial covariance of signals on the phase-reconfigurable reflectarray 1 allows direct computation of the phase-state change needed to achieve the objective function or the computation may use a method by which an iterative search over the possible phase-state changes leads to a phase-state configuration that achieves the required objective function.

The array beamformer processor 14 commands the array control processor 15 to configure the computed phase-state change of some or all of the reflectors 2 on the phase-reconfigurable reflectarray at a certain time to implement the required beams and nulls on the respective desired and undesired radio signals. The array beamformer processor 14 may be implemented using analog and/or digital circuits to achieve its functions.

The signal processor 16 is used for both radio signal reception and transmission. For radio signal reception, the signal processor 16 takes baseband signals from the radio-frontend 12 and the auxiliary radio-frontend 11 (if present, see FIG. 7) as input. The signal processor 16 may perform additional adaptive processing using the baseband signals from the radio-frontend 12 and optionally the auxiliary radio-frontend 11 to achieve additional gain on the desired radio signals and additional suppression of the undesired radio signals.

For radio communications applications, the signal processor 16 may:

(a) perform receiver processing such as detection, estimation, synchronization, demodulation, and decoding of information bits that are encoded and modulated on desired signals within the input received baseband sample stream; and/or (b) perform transmitter processing to encode and modulate signals into a baseband sample stream.

For radio signal angle-of-arrival estimation and radar applications, the signal processor 16 estimates range, direction, and rate parameters of the desired signals from the input baseband signals. For other radio sensing applications, such as, for example, metrology, the signal processor 16 may estimate parameters of the physical signals or natural or man-made phenomenon being sensed.

For radio signal transmission, the signal processor 16 generates baseband signals for input to the radio-frontend 12 and the auxiliary radio-frontend 11. The signal processor 16 may be implemented using analog and/or digital circuits to achieve its functions.

The embodiment shown in FIG. 4 and FIG. 7 includes additional components. The auxiliary radio-frontend 11 is used to convert analog signals between digital signals. For radio signal reception, the auxiliary radio-frontend 11 converts radio frequency signals arriving from the auxiliary antenna 9 to baseband signals for input to the array estimation processor 13 and the signal processor 16. For radio signal transmission, the auxiliary radio-frontend 11 converts baseband signals from the signal processor 16 to radio frequency signals for input to the auxiliary antenna 9. The oscillators and clocks of the auxiliary radio-frontend 11 are synchronized to those of the radio-frontend 12 using synchronization lines 18 to have a common frequency. Further, the synchronization lines 18 may be used to ensure that measurements taken by the radio-frontend 12 and the auxiliary radio-frontend 11 occur at the same time.

The auxiliary antenna 9 is mechanically positioned so that some set of the main and primary lobes from its gain pattern cover some or all of the reflectors 2 of the phase-reconfigurable reflectarray 1. Radio signals from the environment that are incident on the auxiliary antenna 9 are conveyed to the auxiliary radio-frontend 11 via an auxiliary radio signal transmission line 10, which may be, for example, a cable or waveguide. The auxiliary antenna 9 is resonant at the same radio frequency bands and polarizations as the antenna 3.

As noted above the auxiliary antenna 9 and auxiliary radio-frontend 11 are optional, and are not part of the embodiment shown in FIGS. 3 and 6. They may be used to provide improved processing outcomes under certain dynamic conditions of the undesired radio signals.

Note that while FIGS. 6 and 7 show the array estimation processor 13, the array control processor 15, the array beamformer processor 14 and the signal processor 16 as being separate components, some or all of these components may be implemented using a single processing unit. For example, the processing unit may be a microcontroller, a general purpose microprocessor, or an application specific processor. In the scenario where a general purpose microprocessor is used, each component may be implemented as a software program or software routine that executes on the microprocessor. Thus, the implementation of these components is not limited by the disclosure.

Note that the radio system may be configured to transmit and receive signals or to only receive signals. Additionally, the radio system may be configured to transmit and receive signals using the same set of frequency bands (including the set of one band) or using different frequency bands for transmit and receive. Similarly, the radio system may be configured to transmit and receive signals on the same set of polarization (including the set of one polarization) or using different polarizations for transmit and receive.

Having defined the various components of the system, several examples of its operation will now be provided.

The antenna 3 provides signals to the radio-frontend 12, which then supplies baseband signals to the array estimation processor 13. The array estimation processor 13 is provided with an objective function that it is attempting to optimize. The optimization may be to either minimize or maximize the objective function depending on the function being used. The objective function is computed by the array estimation processor 13 using parameters that it estimates from the baseband signals and the state of the phase-reconfigurable reflectarray 1. In this disclosure, the terms "reflectarray phase-state", and "phase-state configuration" are used interchangeably and are defined as a fixed phase and amplitude state held by the set of all reflectors 2 for a period of time. Any change in any reflector's state corresponds to a different reflectarray phase-state.

Examples of estimated parameters may be the total received power, the received signal power, the received interference power, and the receiver noise power. In the configuration shown in FIGS. 4 and 7, these estimated parameters may also be computed based on baseband signals received from the auxiliary radio-frontend 11.

The optimization of the objective function may begin with an initial reflectarray phase-state that produces a suitable initial beam pattern. One way to select the initial reflectarray phase-state is to choose a reflectarray phase-state that points a beam in the general direction of the desired signals. To achieve this, a computational model of the phase-reconfigurable reflectarray 1 may be used to compute the reflectarray phase-state that causes a suitable beam pattern to be formed by the system. Alternatively, a coarse calibration of the reflectarray system performed at time of manufacturing (such as measurements of the system's beam patterns performed in a radio anechoic chamber) may be used to generate a lookup table of reflectarray phase-states for any number of beam directions or beam patterns. Both approaches for establishing an initial beam pattern may be used together with an estimate of the system's position and orientation in space, as determined by the position and orientation processor 25, to achieve an appropriate initial pattern with respect to the desired signal.

The optimization of the objective function may then proceed using one of two general approaches. In the first approach, referred to as the online incremental search approach, possible reflectarray phase-states, referred to as candidates, are introduced to the reflectarray to find which candidate causes the most beneficial incremental improvement to the objective function. In each iteration of the search, multiple candidates may be explored and only the most beneficial candidate is kept before proceeding with the next iteration. The candidates may be either randomly generated or systematically generated by the array estimation processor 13. For random changes, only a relatively small number of candidates are generated from the very large set of all possible reflectarray phase-states, for exploration. Furthermore, these candidates may be generally similar to the current reflectarray phase-state (wherein some reflectors are changed and the change is a small change of the current phase or amplitude). For systematic candidates, the candidates can be very different from each other and may span a representative subset of the entire set of possible states. For each candidate, the array estimation processor 13 sends the candidate reflectarray phase-state to the array control processor 15 so that the desired reflectarray phase-state may be implemented on the phase-reconfigurable reflectarray 1. After the candidate reflectarray phase-state has been applied, a baseband signal is observed from the radio-frontend 12. As the iterations proceed, incremental improvements are made to the objective function until the array estimation processor 13 determines that the objective function has reached an optimum value. At this point, the array estimation processor 13 provides the array control processor 15 with the reflectarray phase-state that produced the optimum value of the objective function. This completes the adapted beam acquisition phase of operation. In the subsequent beam tracking phase, the array estimation processor 13 may continue to compute the objective function to ensure that it does not diverge significantly from the established optimum value. Alternatively, performance degradation may be indicated to the array estimation processor 13 by the signal processor 16 based on performance parameters, such as packet error rate. If the objective value function's does diverge significantly, then the online incremental search may then restart and proceed until the objective function has again reached an optimum value and the corresponding optimum phase-state is implemented on the phase-reconfigurable reflectarray 1. The array beamformer processor 14 plays no role in this method of optimizing the objective function. This iterative process may continue a plurality of times, such as more than 10, more than 100 or more than 1000.

The embodiment described above may be augmented by using the signal processor 16. For example, the signal processor 16 may identify a specific training sequence that is transmitted by the desired sources. The signal processor 16 may then provide an indication of the power level of this training sequence to the array estimation processor 13. The array estimation processor 13 may then instruct the array control processor 15 to provide a different reflectarray phase-state to the phase-reconfigurable reflectarray 1. The array estimation processor 13 may perform the online incremental search approach described above until the power of the desired signal is maximized.

Additionally, the auxiliary antenna 9 may also be used to improve the results. As an example, assume that the array estimation processor 13 is attempting to maximize or minimize a parameter associated with signal power. Assume also that after making a change to the reflectarray phase-state, the incoming signal power changes. There are two possible causes for this. First, the change made to the reflectarray phase-state may have caused this signal power change. Additionally or alternatively, the power of the incoming signal, as received at the phase-reconfigurable reflectarray 1, may have changed. By receiving an input from the auxiliary antenna 9, the array estimation processor 13 may be able to more accurately attribute this change in power to these two causes. For example, assume that the array estimation processor 13 makes a change to the reflectarray phase-state and the power of the incoming signal is reduced by 5 dB. Simultaneously, the auxiliary antenna 9 detects a reduction in total power of 3 dB. The array estimation processor 13 may determine that only 2 dB of that change is attributable to the change in the reflectarray phase-state. Note that by using a synchronization line 18, the measurement taken by the radio-frontend 12 may be taken at exactly the same time as the measurement taken by the auxiliary radio-frontend 11.

Thus, in this approach, the array beamformer processor 14 is not involved in the iterations that the array estimation processor 13 performs. Rather, the array estimation processor 13 is provided with an objective function, which may be based on received power (such as total power, noise power, preferred power) and performs a plurality of iterations, with the array control processor 15 to achieve this objective. Further, these objective functions may be associated with a particular angle of incidence or with a particular frequency.

Figure 8:
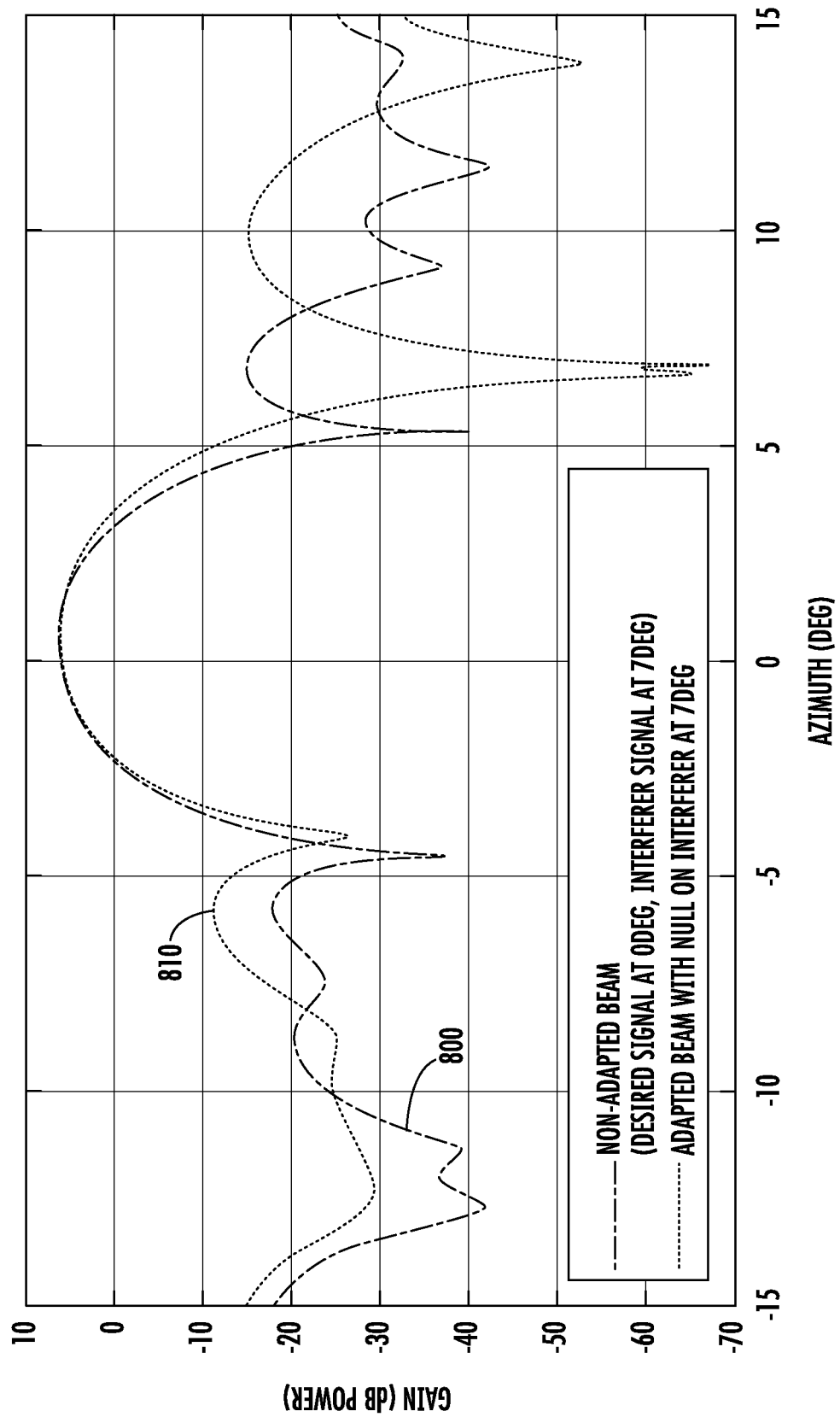
FIG. 8 shows an azimuth non-adapted gain pattern for the prototype system and the azimuth adapted gain pattern, both operating in the presence of a radio interference arriving at the angle of 7 degrees.

FIG. 8 shows one such objective function. In this example, line 800 shows the gain pattern of the system before any processing. In this example, the desired signal is received at an azimuth angle of 0°, while an interferer is transmitting a signal having greater power at an azimuth angle of 7°. The array estimation processor 13 is provided with an objective function to reduce the total power received (which includes signal power, interference power and noise). In this example, since the largest magnitude signal is the one at an azimuth angle of 7°, the array estimation processor 13 converges to a solution that minimizes the signal at that angle. Using the online incremental search approach described above, the array estimation processor 13 iterates and creates the reflectarray phase-state that results in the gain pattern shown in line 810. Note that the power of the interfering signal is reduced by more than 40 dB.

Figure 9:
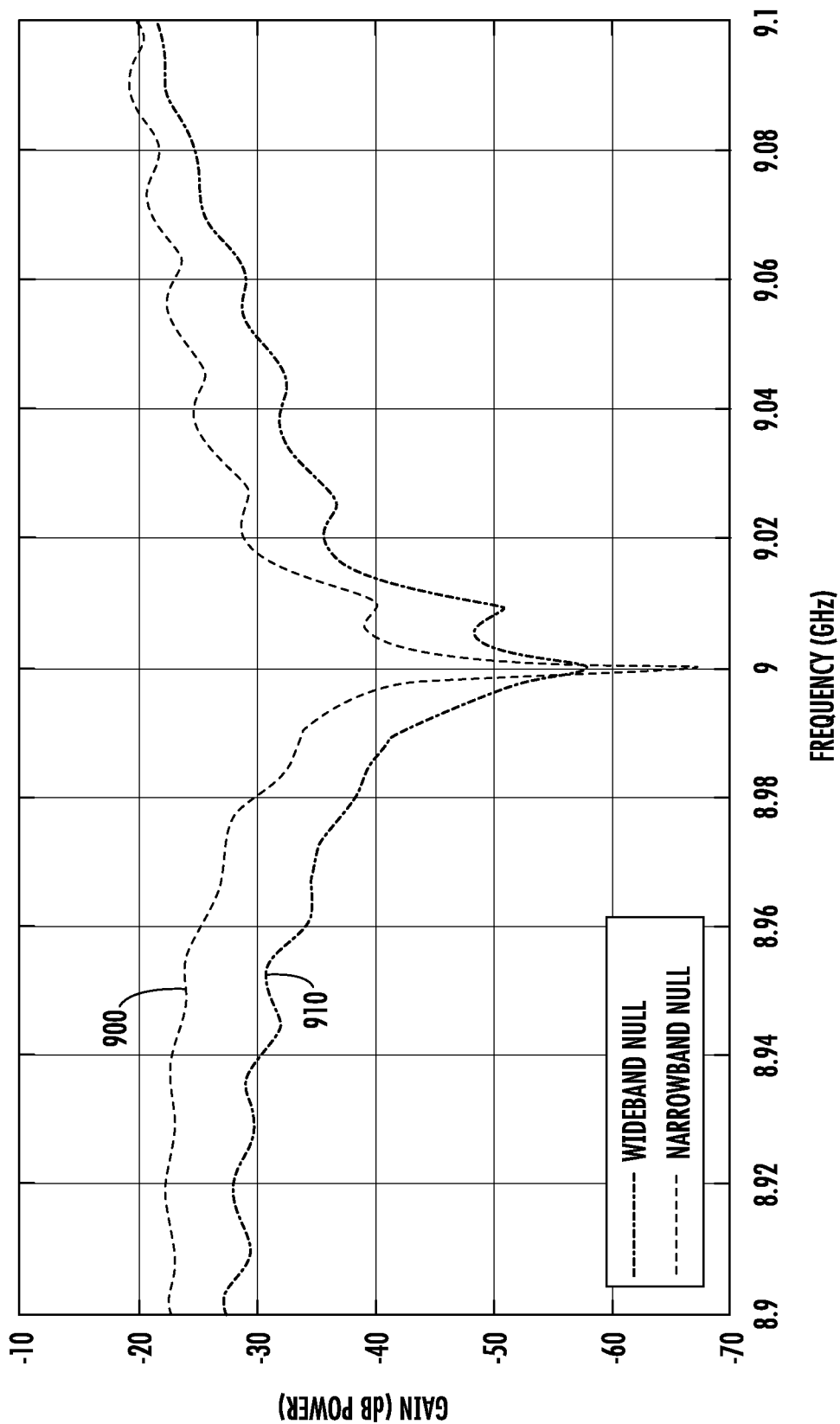
FIG. 9 shows the frequency response at the prototype system's receiver in the direction towards the interference after beam adaptation for a beamformer objective that produced a wideband null and a beamforming objective that produces a narrowband null.

FIG. 9 shows an example where the objective function is to minimize total received power at a particular frequency. In Line 900, the objective function was to minimize total received power at 9 GHz, which produces a narrowband null at 9 GHz in the direction of the interference signal while preserving gain in the direction of the desired signal. This may be useful when desired signals are being transmitted at a frequency close to that of the interferer. In Line 910, the objective function was to minimize total received power over a frequency range (such as 25 MHz) centered at 9 GHz. This produces a wideband null at 9 GHz in the direction of the interference signal while preserving gain in the direction of the desired signal.

Note that the objective function is not limited; it may be related to power level, frequency, azimuth angle, elevation angle and other parameters.

In other embodiments, the iterative process also includes the array beamformer processor 14. For example, it may be desirable to determine spatial covariance. In the second approach to optimizing the objective function, which is referred to as the online-offline estimation approach, a set of reflectarray phase-states are sequentially implemented on the phase-reconfigurable reflectarray 1 in the online phase of computation. This set of reflectarray phase-states may either be predefined or updated online during optimization of the objective function. For each reflectarray phase-state in the set, baseband signals are provided to the array estimation processor 13, which then computes a set of estimated parameters for the baseband signals corresponding to that reflectarray phase-state. Once the estimated parameters from the sequential set of all reflectarray phase-states have been computed, a subsequent offline phase of computation is used to estimate additional parameters. This subsequent computation is performed on the set of previously estimated parameters. The computation is an iterative offline optimization on the given objective function using the online parameters. Unlike the online incremental search approach described above, this approach is performed in offline computation (i.e. not during reception of baseband signals or changing of the reflectarray phase-state). As iterations proceed, the objective function is incrementally optimized until some stopping condition for optimality is reached.

Examples of the additional parameters computed in the offline estimation phase may include the spatial covariance matrix of the signal-plus-interference or spatial covariance matrix of the interference alone or the spatial response vector of the array to the desired signals. Spatial covariance and array response are defined here with respect to the reflectors 2 in the phase-reconfigurable reflectarray 1. Many of these parameters are of the kind estimated by conventional digital receiver arrays that perform adaptive beamforming across their plurality of antenna elements but which are not readily available for direct estimation across the reflectors in the presently disclosed system.

Once these offline parameters have been computed, these parameters are provided to the array beamformer processor 14, which uses them to compute the appropriate reflectarray phase-states for the phase-reconfigurable reflectarray 1 to implement. In some embodiments, the array beamformer processor 14 is provided with the offline-estimated parameters such as covariance, in the form of a N×N covariance matrix, or array response, in the form of 1×N vector. N is, at most, equal to the number of reflectors 2 in the array. In some embodiments, N may be fewer than the number of reflectors. For example, groups of reflectors may be treated as sub-arrays of the larger array and an adaptation is taking place on subarrays or groups of reflectors in the array that are being controlled together.

This computation may need to account for the fact that the reflectors 2 may only achieve discrete phases or amplitudes. Once an appropriate reflectarray phase-state is found that achieves the required adapted beam, the array beamformer processor 14 sends the reflectarray phase-state to the array control processor 15 so that that reflectarray phase-state may be implemented on the phase-reconfigurable reflectarray 1.

This process describes the beam acquisition phase of the system. This process may be repeated as required during subsequent beam tracking phases to update the beam if performance degrades. Performance degradation may be indicated by the signal processor 16, based on, for example, packet error rate from a modem's decoder. Alternatively, performance degradation may be indicated based on continued online estimation of parameters in the array estimation processor 13.

In summary, the radio system may have some or all of the following attributes.

The radio system may operate at times in the absence of undesired radio signals to produce beams (increased spatial gain) in directions of desirable signals and then at times in the presence of undesired radio signals to produce beams in directions of desired signals and nulls (reduced spatial gain) in directions of undesirable signals.

The radio system may be configured to operate using the single antenna and radio-frontend or to use the antenna and radio-frontend together with an auxiliary antenna and an auxiliary radio-frontend.

The radio system may be configured to use an analog radio with analog circuits performing the requisite processing or using a digital radio with digital circuits performing the requisite processing or using a radio implementing the requisite processing using a hybrid of digital or analog circuits.

The radio system may be configured to enable a radio communication link, or radar, or radio sensing of a natural or manmade phenomenon (e.g., detection and localization).

Figure 5:
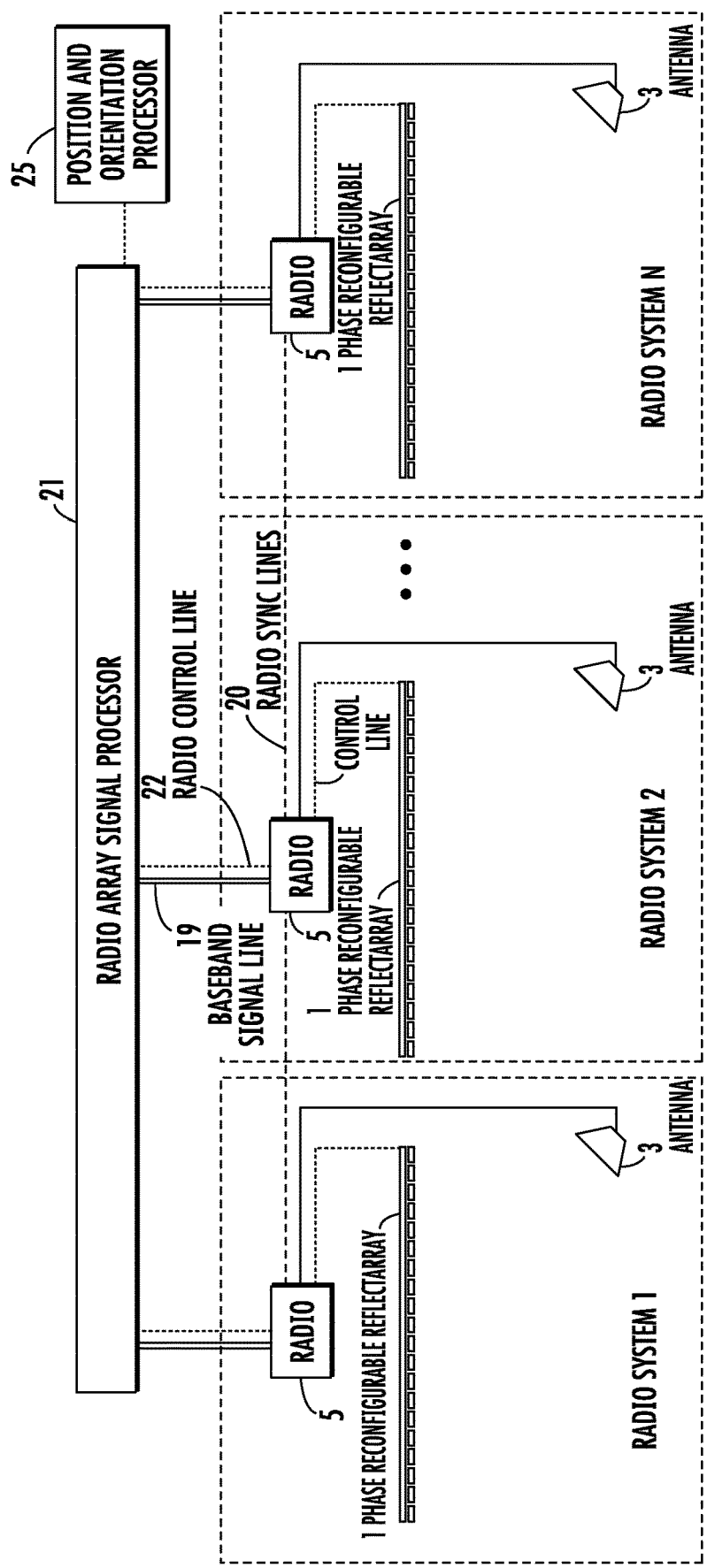
FIG. 5 shows a plurality of the radio systems of FIG. 3 used together to form a coherent super-array wherein the radios may share common time and frequency references for synchronization over the Radio Sync Lines.

In another embodiment, shown in FIG. 5, the radio system may be configured to operate with a plurality of similar radio systems as a super array. This may be implemented on the same platform or vehicle, or may be distributed across a multiplicity of platforms or vehicles. In this embodiment, the plurality of beamformed baseband signals 19 are processed by a radio array signal processor 21 to provide application-relevant functionality including, but not limited, to modulation, demodulation, encoding, decoding, detection, angle-of-arrival estimation, emitter range estimation, emitter geolocation, emitter signal classification, power estimation, and adaptive beamforming. Additionally, the radio systems are synchronized through the use of radio sync lines 20. Further, the radio array signal processor 21 may provide instructions or control information to the radio systems through the control line 22. In certain embodiments, the radio systems function as described above, and the radio array signal processor 21 simply receives the final beamformed baseband signal 19 from each radio system. In another embodiment, the radio array signal processor 21 may provide instructions to each radio system to further refine the baseband signals that are received from each radio system.

In addition to application for radio communication on a satellite, the disclosed system may be applied to:

Satcom links using radio terminals that operate in the presence of radio interference. Examples include gateway terminals, space terminals, marine terminals, airborne terminals, and ground terminals.

Terrestrial and airborne radio communication links that operate in the presence of radio interference. Examples include use at each end of a point-to-point wireless backhaul link for cellular and other terrestrial radio network.

Radar platforms operating in the presence of radio interference. An example includes a radar operating in the same band as nearby cellular base stations.

Terrestrial, airborne, and space-based radio sensing platforms operating in the presence of radio interference. An example includes a space-based weather sensor operating in the presence of ground-based man-made interference sources.

Anti-jam communications satellites, anti-jam terrestrial communications radios, and anti-jam airborne communication radios.

The present system has many advantages. This disclosure describes an anti-jam satcom uplink radio system that uses a single receiver radio, a phase-reconfigurable reflectarray, and an antenna used together to suppress (null) a multiplicity of sources of undesirable (interference) radio signals. In contrast, conventional state-of-the-art anti-jam satcom uplink radios employ an array of digital receiver radios for anti-jam satcom for which the number of undesirable sources that can be nulled is equal to one less than the number of digital receivers. The use of a single receiver radio reduces the complexity, and thereby the cost, of an anti-jam communications satellite as compared to conventional state-of-the-art anti-jam satcom uplink radios. Further, the use of a reflectarray provides greater protection against strong interference than what a conventional radio can tolerate alone because the reflectarray, with the appropriate phase-state configuration, suppresses the interference power before it reaches the receiver. Lastly, the reflectarray provides transmit and receive beamforming from the same aperture using the same beamforming weights.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

What is claimed is:

1. A system comprising:
   a phase-reconfigurable reflectarray comprising a plurality of phase-reconfigurable reflectarray elements to receive radio signals;
   an antenna to receive signals redirected by the phase-reconfigurable reflectarray; and
   a radio, wherein the radio comprises:
   a radio-frontend in communication with the antenna to generate baseband signals;
   an array estimation processor to estimate radio parameters based on the baseband signals and to generate reflectarray phase-states;
   an array beamformer processor to create a beam having certain radio parameters; and
   an array control processor to receive the reflectarray phase-states from the array estimation processor and information from the array beamformer processor and to generate control signals to control the plurality of phase-reconfigurable reflectarray elements;
   wherein the system is configured to form spatial beams that amplify desired radio signals received from one or more arrival directions and adaptively form spatial nulls to suppress undesired radio signals arriving from one or more directions.

2. The system of claim 1, wherein the system is configured to form spatial beams that amplify a transmission of one or more radio signals in one or more desirable directions and adaptively form spatial nulls to suppress the transmission of one or more radio signals in one or more undesirable directions.

3. The system of claim 1, wherein the radio performs processing necessary to compute a phase-state configuration for the plurality of phase-reconfigurable reflectarray elements such that the spatial beams and nulls are formed.

4. The system of claim 1, wherein the system is utilized in an anti-jam communications satellite, an anti-jam terrestrial communications radio or an anti-jam airborne communications radio.

5. The system of claim 1, wherein the
   array estimation processor is configured to iteratively generate candidate reflectarray phase-states to optimize an objective function; and
   the array control processor is configured to receive the candidate reflectarray phase-states from the array estimation processor and generate control signals to control the plurality of phase-reconfigurable reflectarray elements.

6. The system of claim 5, wherein the radio parameters comprise total received power, received signal power, received interference power, and/or receiver noise power.

7. The system of claim 5, further comprising an auxiliary antenna and an auxiliary radio-frontend, wherein an output of the auxiliary radio-frontend is also provided to the array estimation processor to estimate the radio parameters.

8. A system comprising:
   a phase-reconfigurable reflectarray comprising a plurality of phase-reconfigurable reflectarray elements to receive radio signals;
   an antenna to receive signals redirected by the phase-reconfigurable reflectarray; and
   a radio, wherein the radio comprises:
   a radio-frontend in communication with the antenna to generate baseband signals;
   an array estimation processor to estimate radio parameters based on the baseband signals and iteratively generate candidate reflectarray phase-states to optimize an objective function; and
   an array control processor to receive the candidate reflectarray phase-states from the array estimation processor and generate control signals to control the plurality of phase-reconfigurable reflectarray elements;
wherein the array estimation processor is configured to perform an online incremental search, comprising:
estimating the radio parameters for a first reflectarray phase-state;
generating a set of candidate reflectarray phase-states based on the radio parameters;
providing each candidate reflectarray phase-state to the array control processor;
receiving a baseband signal from the radio-frontend for each of the candidate reflectarray phase-states; and selecting one of the candidate reflectarray phase-states as causing a most beneficial incremental improvement to the objective function.

9. The system of claim 8, wherein the online incremental search is repeated a plurality of times, wherein the candidate reflectarray phase-state that is selected is then used to generate a new set of candidate reflectarray phase-states.

10. The system of claim 1, wherein the array estimation processor is configured to perform an online-offline estimation, comprising:
providing a first set of reflectarray phase-states to the array control processor;
estimating the radio parameters for each of the reflectarray phase-states in the first set of reflectarray phase-states; and
iteratively computing additional radio parameters based on the radio parameters obtained from the first set of reflectarray phase-states until a completion criteria is reached.

11. The system of claim 10, wherein the additional radio parameters comprise spatial covariance matrix of a signal-plus-interference or spatial covariance matrix of an interference alone or a spatial response vector of the phase-reconfigurable reflectarray to desired signals.

12. The system of claim 10, wherein the additional radio parameters that are computed are provided to the array beamformer processor, and wherein array beamformer processor uses the additional radio parameters and a configuration of the phase-reconfigurable reflectarray to generate a desired reflectarray phase-state; and wherein the array beamformer processor forwards the desired reflectarray phase-state to the array control processor.

13. A method of providing protection against strong interference by suppressing interference power before it reaches a receiver disposed in the radio using the system of claim 1, wherein the plurality of phase-reconfigurable reflectarray elements are configured to destructively combine the interference power.

14. A method to provide, transmit, and receive beamforming from the same aperture by the same beamforming weights using the system of claim 1.

15. The system of claim 8, wherein the system is utilized in an anti-jam communications satellite, an anti-jam terrestrial communications radio or an anti-jam airborne communications radio.

16. The system of claim 8, wherein the radio parameters comprise total received power, received signal power, received interference power, and/or receiver noise power.

17. The system of claim 8, further comprising an auxiliary antenna and an auxiliary radio-frontend, wherein an output of the auxiliary radio-frontend is also provided to the array estimation processor to estimate the radio parameters.

18. A method of providing protection against strong interference by suppressing interference power before it reaches a receiver disposed in the radio using the system of claim 8, wherein the plurality of phase-reconfigurable reflectarray elements are configured to destructively combine the interference power.

19. The system of claim 1, wherein the radio parameters comprise total received power, received signal power, received interference power, and/or receiver noise power.

20. The system of claim 1, further comprising an auxiliary antenna and an auxiliary radio-frontend, wherein an output of the auxiliary radio-frontend is also provided to the array estimation processor to estimate the radio parameters.

* * * * *